US007707509B2

(12) United States Patent
Naono et al.

(10) Patent No.: US 7,707,509 B2
(45) Date of Patent: Apr. 27, 2010

(54) DEVICE AND METHOD FOR ASSISTING INPUT OPERATIONS

(75) Inventors: Ken Naono, Tachikawa (JP); Hiroaki Fujii, Kokorozawa (JP); Masashi Egi, Kokubunji (JP); Shunji Takubo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 760 days.

(21) Appl. No.: 11/485,982

(22) Filed: Jul. 14, 2006

(65) Prior Publication Data

US 2007/0050725 A1 Mar. 1, 2007

(30) Foreign Application Priority Data

Aug. 26, 2005 (JP) ............................. 2005-245740

(51) Int. Cl.
*G06F 3/00* (2006.01)
*G06F 3/048* (2006.01)

(52) U.S. Cl. ....................................... 715/764; 715/781

(58) Field of Classification Search ................. 715/738, 715/850, 855, 764, 781, 802
See application file for complete search history.

(56) References Cited

U.S. PATENT DOCUMENTS 6,192,343 B1 * 2/2001 Morgan et al. .............. 704/275

FOREIGN PATENT DOCUMENTS

JP 10-27089 1/1998

* cited by examiner

*Primary Examiner*—Steven B Theriault
*Assistant Examiner*—Truc T Chuong
(74) *Attorney, Agent, or Firm*—Brundidge & Stanger, P.C.

(57) ABSTRACT

Collectively predicting input operations for plural operation object items (subwindows) belonging to a same window. A proposal window PG stores in a statistics information database and manages information about the input entity and an operation object of an input operation accepted from a user, and a window to which the operation object belongs, along with transition information indicating the transition of active windows concerned in previous input operations. When an active window transitions because of an input operation accepted from the user, it searches the statistics information database for information that contains information about a new active window and is associated with transition information matching the transition of active windows concerned in previous input operations.

5 Claims, 15 Drawing Sheets

PROPOSAL WINDOW PG 14

START
S301 DISPLAY THE RECORD WINDOW AND THE PROPOSAL WINDOW
S302 TRANSITION TO THE ACTIVE WINDOW? — YES / NO
S303 UPDATE TRANSITION INFORMATION AND DISPLAY THE RESULT IN THE RECORD WINDOW
S304 DOES INPUT INFORMATION WITH SUB-WINDOW BELONGING TO THE ACTIVE WINDOW AS INPUT DESTINATION EXIST? — YES / NO
S305 FOR EACH SUB-WINDOW EXTRACT INPUT INFORMATION CORRESPONDING TO TRANSITION INFORMATION INDICATED BY THE RECORD WINDOW FROM INPUT INFORMATION WITH THE SUB-WINDOW AS INPUT DESTINATION
S306 DISPLAY INFORMATION EXTRACTED FOR EACH SUB-WINDOW IN THE PROPOSAL WINDOW IN DESCENDING ORDER OF STATISTICS VALUE
S307 OK OR NG? — OK / NG
S308 ADD RECORD TO THE RECORD DB
S309 DOES INPUT INFORMATION WITH THE ACTIVE WINDOW AS INPUT DESTINATION EXIST? — YES / NO
S310 EXTRACT INPUT INFORMATION CORRESPONDING TO TRANSITION INFORMATION INDICATED BY THE RECORD WINDOW FROM INPUT INFORMATION WITH THE ACTIVE WINDOW AS INPUT DESTINATION
S311 DISPLAY EXTRACTED INFORMATION IN THE PROPOSAL WINDOW IN DESCENDING ORDER OF STATISTICS VALUE
S312 OK OR NG? — OK / NG
S313 ADD RECORD TO THE RECORD DB

FIG. 5

HIERARCHY DEFINITION TL 16

1601 1602 1603 1600

| OBJECTIVE WINDOWS/ SUB-WINDOW | PARENT WINDOW | HIERARCHY LEVEL |
|---|---|---|
| MAIN MENU | – | THE FIRST HIERARCHY |
| EMPLOYEE PORTAL | – | THE SECOND HIERARCHY |
| ID INPUT | EMPLOYEE PORTAL | THE SECOND HIERARCHY |
| PW INPUT | EMPLOYEE PORTAL | THE SECOND HIERARCHY |
| TASK MENU | – | THE THIRD HIERARCHY |
| BUSINESS TRIPS | – | THE FOURTH HIERARCHY |
| APPROVER SPECIFICATION | BUSINESS TRIPS | THE FOURTH HIERARCHY |
| DATE SPECIFICATION | BUSINESS TRIPS | THE FOURTH HIERARCHY |
| PURPOSE OF BUSINESS TRIP | BUSINESS TRIPS | THE FOURTH HIERARCHY |
| DEPARTURE PLACE | BUSINESS TRIPS | THE FOURTH HIERARCHY |
| DESTINATION | BUSINESS TRIPS | THE FOURTH HIERARCHY |
| SETTLEMENT AMOUNTS | BUSINESS TRIPS | THE FOURTH HIERARCHY |
| VISITOR | – | THE FOURTH HIERARCHY |
| ⋮ | ⋮ | ⋮ |
| PUBLICATION | – | THE FOURTH HIERARCHY |
| ⋮ | ⋮ | ⋮ |
| NOTICE | – | THE THIRD HIERARCHY |
| ⋮ | ⋮ | ⋮ |
| ANNOUNCEMENT | – | THE THIRD HIERARCHY |
| ⋮ | ⋮ | ⋮ |
| WELFARE | – | THE THIRD HIERARCHY |
| ⋮ | ⋮ | ⋮ |

FIG. 6

RECORD INFORMATION DATABASE 17

1700 1701 1703 1704 1705 1706 1702

| RECORD ID | INPUT WINDOW | INPUT ENTITY | INPUT HIERARCHY | INPUT DATE |
|---|---|---|---|---|
| 00001 | MAIN MENU | CLICK: EMPLOYEE PORTAL | FIRST | 2005/07/10:02:50 |
| ⋮ | ⋮ | ⋮ | ⋮ | ⋮ |
| 00004 | EMPLOYEE PORTAL | CLICK: TASK MENU | SECOND | 2005/07/10:02:52 |
| 00005 | TASK MENU | CLICK: BUSINESS TRIPS | THIRD | 2005/07/10:02:54 |
| 00006 | APPROVER SPECIFICATION | PULLDOWN SELECTION: HANAKO HITACHI | FOURTH | 2005/07/10:02:56 |
| ⋮ | ⋮ | ⋮ | ⋮ | ⋮ |
| 00008 | PURPOSE OF BUSINESS TRIP | KEY INPUT: U | FOURTH | 2005/07/10:03:23 |
| | PURPOSE OF BUSINESS TRIP | KEY INPUT: T | FOURTH | 2005/07/10:03:23 |
| | PURPOSE OF BUSINESS TRIP | KEY INPUT: I | FOURTH | 2005/07/10:03:24 |
| | PURPOSE OF BUSINESS TRIP | KEY INPUT: A | FOURTH | 2005/07/10:03:24 |
| | PURPOSE OF BUSINESS TRIP | KEY INPUT: W | FOURTH | 2005/07/10:03:24 |
| | PURPOSE OF BUSINESS TRIP | KEY INPUT: A | FOURTH | 2005/07/10:03:25 |
| | PURPOSE OF BUSINESS TRIP | KEY INPUT: S | FOURTH | 2005/07/10:03:25 |
| | PURPOSE OF BUSINESS TRIP | KEY INPUT: E | FOURTH | 2005/07/10:03:25 |
| | PURPOSE OF BUSINESS TRIP | KEY INPUT: CONVERSION KEY | FOURTH | 2005/07/10:03:26 |
| | PURPOSE OF BUSINESS TRIP | KEY INPUT: ENTER KEY | FOURTH | 2005/07/10:03:26 |
| ⋮ | ⋮ | ⋮ | ⋮ | ⋮ |
| 00011 | SETTLEMENT AMOUNTS | KEY INPUT: 6 | FOURTH | 2005/07/10:03:40 |
| | SETTLEMENT AMOUNTS | KEY INPUT: 7 | FOURTH | 2005/07/10:03:40 |
| | SETTLEMENT AMOUNTS | KEY INPUT: 0 | FOURTH | 2005/07/10:03:41 |
| | SETTLEMENT AMOUNTS | KEY INPUT: 1 | FOURTH | 2005/07/10:03:41 |
| | SETTLEMENT AMOUNTS | KEY INPUT: 9 | FOURTH | 2005/07/10:03:41 |
| | SETTLEMENT AMOUNTS | KEY INPUT: 4 | FOURTH | 2005/07/10:03:42 |
| | SETTLEMENT AMOUNTS | KEY INPUT: ENTER KEY | FOURTH | 2005/07/10:03:42 |
| ⋮ | ⋮ | ⋮ | ⋮ | ⋮ |

FIG. 7

STATISTICS INFORMATION DATABASE 18

1800

| STATISTICS ID (1801) | TRANSITION INFORMATION (1802) | INPUT WINDOW (1803) | INPUT INFORMATION (1804) | STATISTICS VALUE (1805) |
|---|---|---|---|---|
| 00001 | MAIN MENU → EMPLOYEE PORTAL → TASK MENU | APPROVER SPECIFICATION | PULLDOWN SELECTION: HANAKO HITACHI | FREQUENCY: 981 |
| 00002 | MAIN MENU → EMPLOYEE PORTAL → TASK MENU | APPROVER SPECIFICATION | PULLDOWN SELECTION: TARO HITACHI | FREQUENCY: 90 |
| ⋮ | ⋮ | ⋮ | ⋮ | ⋮ |
| 00032 | MAIN MENU → EMPLOYEE PORTAL → TASK MENU | PURPOSE OF BUSINESS TRIP | KEY INPUT: U → KEY INPUT: T → KEY INPUT: I → KEY INPUT: A → KEY INPUT: W → KEY INPUT: A → KEY INPUT: S → KEY INPUT: E → KEY INPUT: CONVERSION KEY → KEY INPUT: ENTER KEY | FREQUENCY: 781 |
| 00033 | MAIN MENU → EMPLOYEE PORTAL → TASK MENU | PURPOSE OF BUSINESS TRIP | KEY INPUT: R → KEY INPUT: A → KEY INPUT: I → KEY INPUT: K → KEY INPUT: Y → KEY INPUT: A → KEY INPUT: K → KEY INPUT: U → KEY INPUT: CONVERSION KEY → KEY INPUT: ENTER KEY | FREQUENCY: 92 |
| 00033 | MAIN MENU → EMPLOYEE PORTAL → TASK MENU | PURPOSE OF BUSINESS TRIP | KEY INPUT: K → KEY INPUT: E → KEY INPUT: N → KEY INPUT: S → KEY INPUT: H → KEY INPUT: Y → KEY INPUT: U → KEY INPUT: CONVERSION KEY → KEY INPUT: ENTER KEY | FREQUENCY: 87 |
| ⋮ | ⋮ | ⋮ | ⋮ | ⋮ |

STATISTICS INFORMATION GENERATION PG 13
START
S201
TRANSITION OF ACTIVE WINDOW?
YES
NO
S202
UPDATE TRANSITION INFORMATION
S203
RECORD ADDED TO THE RECORD INFORMATION DB?
YES
NO
S204
CORRESPONDING RECORD FOUND IN THE STATISTICS INFORMATION DB?
YES
NO
S205
UPDATE STATISTICS VALUE
S206
GENERATE NEW RECORD

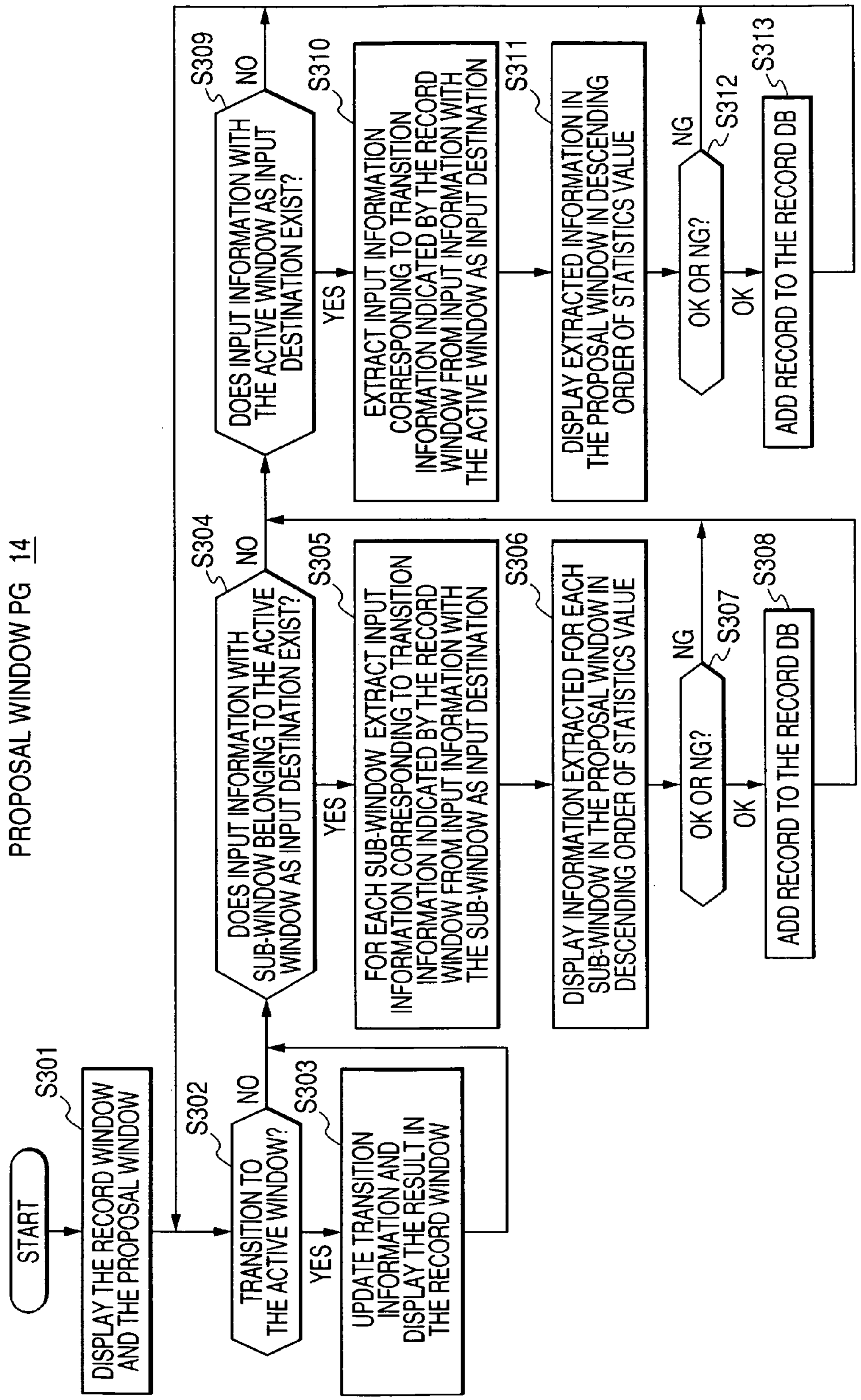
FIG. 10
PROPOSAL WINDOW PG 14
START
DISPLAY THE RECORD WINDOW AND THE PROPOSAL WINDOW
S301
TRANSITION TO THE ACTIVE WINDOW?
S302
YES
NO
UPDATE TRANSITION INFORMATION AND DISPLAY THE RESULT IN THE RECORD WINDOW
S303
DOES INPUT INFORMATION WITH SUB-WINDOW BELONGING TO THE ACTIVE WINDOW AS INPUT DESTINATION EXIST?
S304
YES
NO
FOR EACH SUB-WINDOW EXTRACT INPUT INFORMATION CORRESPONDING TO TRANSITION INFORMATION INDICATED BY THE RECORD WINDOW FROM INPUT INFORMATION WITH THE SUB-WINDOW AS INPUT DESTINATION
S305
DISPLAY INFORMATION EXTRACTED FOR EACH SUB-WINDOW IN THE PROPOSAL WINDOW IN DESCENDING ORDER OF STATISTICS VALUE
S306
OK OR NG?
S307
NG
OK
ADD RECORD TO THE RECORD DB
S308
DOES INPUT INFORMATION WITH THE ACTIVE WINDOW AS INPUT DESTINATION EXIST?
S309
YES
NO
EXTRACT INPUT INFORMATION CORRESPONDING TO TRANSITION INFORMATION INDICATED BY THE RECORD WINDOW FROM INPUT INFORMATION WITH THE ACTIVE WINDOW AS INPUT DESTINATION
S310
DISPLAY EXTRACTED INFORMATION IN THE PROPOSAL WINDOW IN DESCENDING ORDER OF STATISTICS VALUE
S311
OK OR NG?
S312
NG
OK
ADD RECORD TO THE RECORD DB
S313

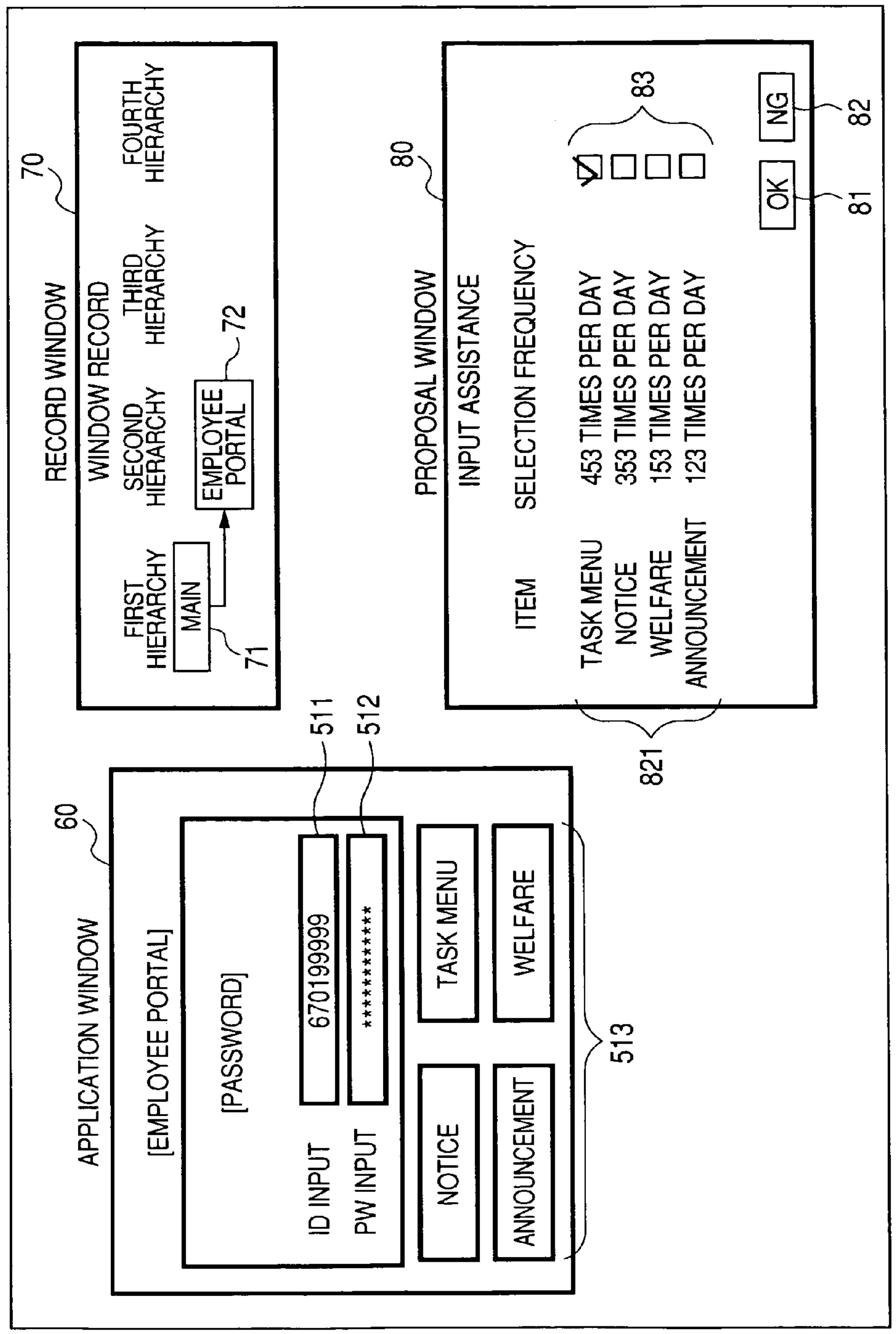
FIG. 13
APPLICATION WINDOW
60
[EMPLOYEE PORTAL]
[PASSWORD]
ID INPUT
6701999999
511
PW INPUT
************
512
NOTICE
TASK MENU
ANNOUNCEMENT
WELFARE
513
RECORD WINDOW
70
WINDOW RECORD
FIRST HIERARCHY
SECOND HIERARCHY
THIRD HIERARCHY
FOURTH HIERARCHY
MAIN
71
EMPLOYEE PORTAL
72
PROPOSAL WINDOW
80
INPUT ASSISTANCE
ITEM
SELECTION FREQUENCY
TASK MENU
453 TIMES PER DAY
NOTICE
353 TIMES PER DAY
WELFARE
153 TIMES PER DAY
ANNOUNCEMENT
123 TIMES PER DAY
821
83
OK
81
NG
82

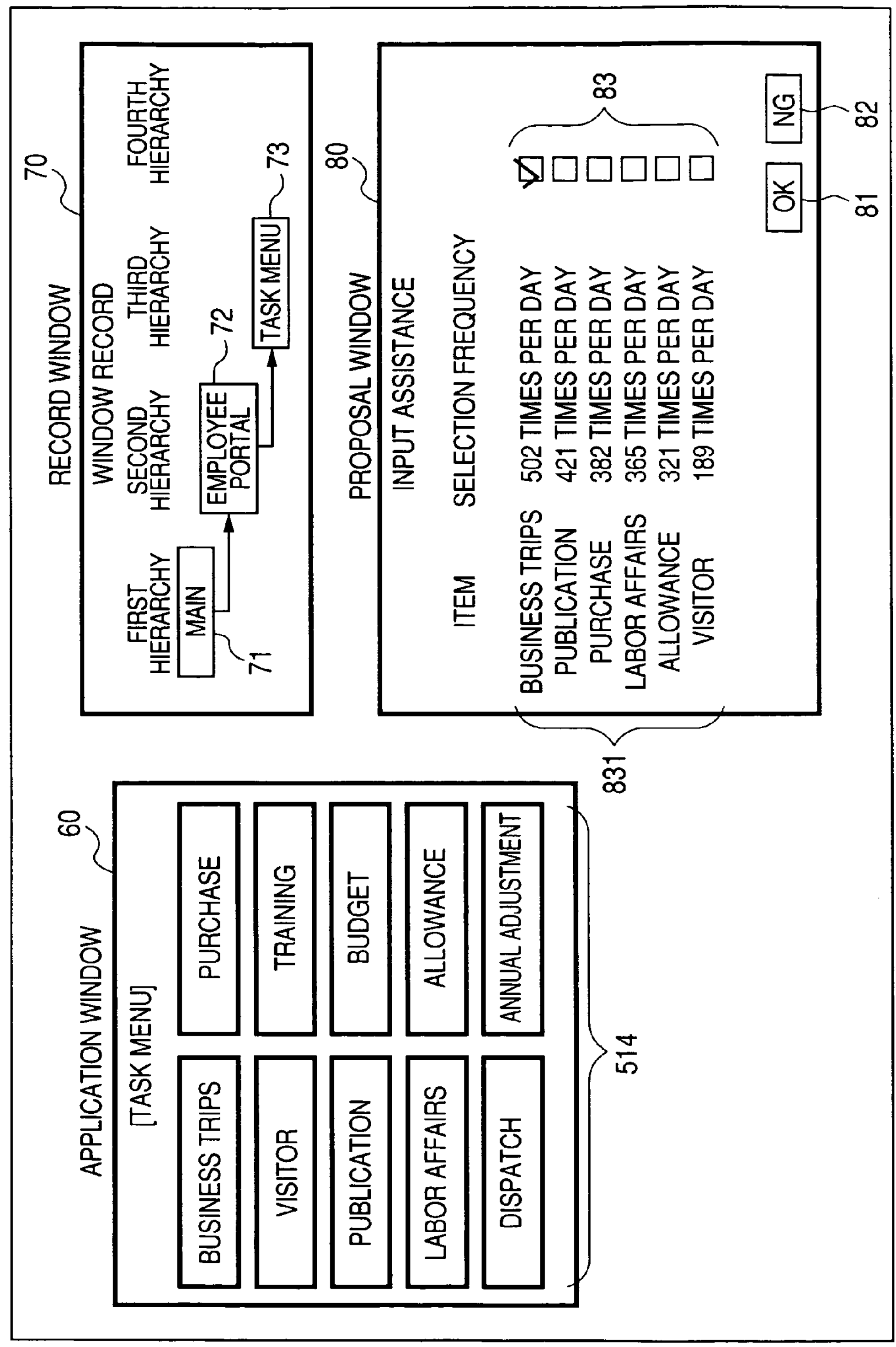
FIG. 14
APPLICATION WINDOW
60
[TASK MENU]
BUSINESS TRIPS
PURCHASE
VISITOR
TRAINING
PUBLICATION
BUDGET
LABOR AFFAIRS
ALLOWANCE
DISPATCH
ANNUAL ADJUSTMENT
514
RECORD WINDOW
70
WINDOW RECORD
FIRST HIERARCHY
SECOND HIERARCHY
THIRD HIERARCHY
FOURTH HIERARCHY
MAIN
71
EMPLOYEE PORTAL
72
TASK MENU
73
PROPOSAL WINDOW
80
INPUT ASSISTANCE
ITEM
SELECTION FREQUENCY
BUSINESS TRIPS 502 TIMES PER DAY
PUBLICATION 421 TIMES PER DAY
PURCHASE 382 TIMES PER DAY
LABOR AFFAIRS 365 TIMES PER DAY
ALLOWANCE 321 TIMES PER DAY
VISITOR 189 TIMES PER DAY
831
83
OK
81
NG
82

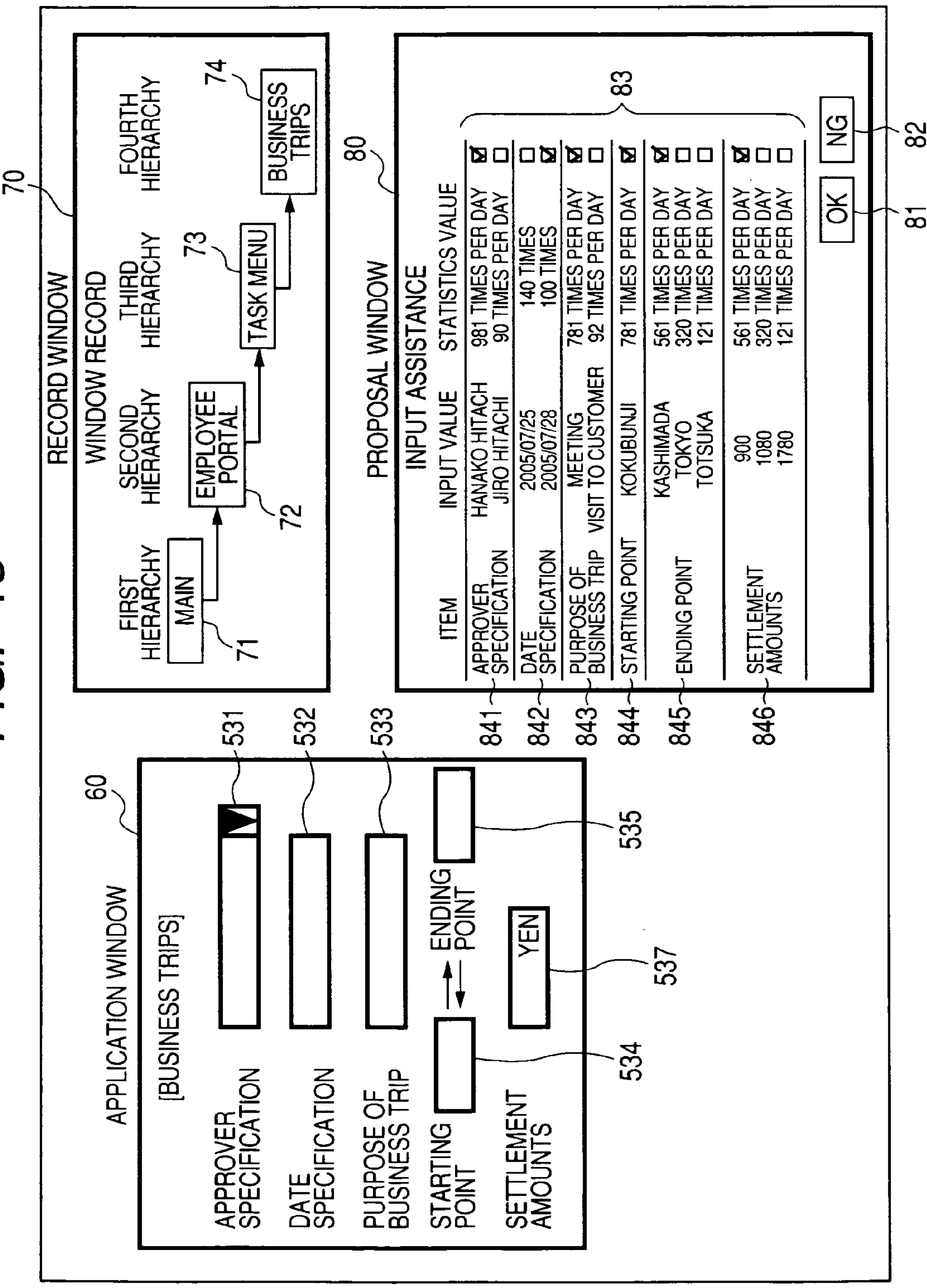
FIG. 15
60
APPLICATION WINDOW
[BUSINESS TRIPS]
APPROVER SPECIFICATION
DATE SPECIFICATION
PURPOSE OF BUSINESS TRIP
STARTING POINT
ENDING POINT
SETTLEMENT AMOUNTS
YEN
531
532
533
534
535
537
70
RECORD WINDOW
WINDOW RECORD
FIRST HIERARCHY
SECOND HIERARCHY
THIRD HIERARCHY
FOURTH HIERARCHY
MAIN
EMPLOYEE PORTAL
TASK MENU
BUSINESS TRIPS
71
72
73
74
80
PROPOSAL WINDOW
INPUT ASSISTANCE
ITEM
INPUT VALUE
STATISTICS VALUE
APPROVER SPECIFICATION
HANAKO HITACH
981 TIMES PER DAY
JIRO HITACHI
90 TIMES PER DAY
DATE SPECIFICATION
2005/07/25
140 TIMES
2005/07/28
100 TIMES
PURPOSE OF BUSINESS TRIP
MEETING
781 TIMES PER DAY
VISIT TO CUSTOMER
92 TIMES PER DAY
STARTING POINT
KOKUBUNJI
781 TIMES PER DAY
ENDING POINT
KASHIMADA
561 TIMES PER DAY
TOKYO
320 TIMES PER DAY
TOTSUKA
121 TIMES PER DAY
SETTLEMENT AMOUNTS
900
561 TIMES PER DAY
1080
320 TIMES PER DAY
1780
121 TIMES PER DAY
83
OK
NG
81
82
841
842
843
844
845
846

DEVICE AND METHOD FOR ASSISTING INPUT OPERATIONS

CLAIM OF PRIORITY

The present application claims priority from Japanese application JP 2005-245740 filed on Aug. 26, 2005, the content of which is hereby incorporated by reference into this application.

FIELD OF THE INVENTION

The present invention relates to a technique for assisting input operations of a computer, particularly a computer in which a multiwindow system is installed.

BACKGROUND OF THE INVENTION

A device for assisting operations on a computer is disclosed in Japanese Unexamined Patent Publication No. Hei 10(1998)-27089. In the device, an operation record storage part identifies the types of applications operated by an operator, and the types of operated operation objects, and stores them in a time series as operation record information along with operation commands. An operation record search part searches operation records for a location in which the same operations as an operation command string of the most recent operation procedure is performing are performed. An operation procedure analyzing part investigates an application in the operation records, the types of operation objects in the searched operation records, and the transition of the operation objects and the like in the searched operation records, and extracts an operation procedure considered to match the purpose of the most recent operation from the search results. A next operation predicting part predicts a next operation command from the extracted operation procedure.

SUMMARY OF THE INVENTION

The technique described in Japanese Unexamined Patent Publication No. Hei 10(1998)-27089 extracts an operation procedure matching the most recent operation procedure from previous operation records, and predicts a next operation command from the extracted operation procedure. Thus, with the technique described in Japanese Unexamined Patent Publication No. Hei 10(1998)-27089, the scope of a predicted input operation is limited to a next operation command, that is, one input operation. The technique described in Japanese Unexamined Patent Publication No. Hei 10(1998)-27089 does not take a collective prediction of plural input operations into account.

The present invention has been made in view of the above circumstances, and its object is to enable a collective prediction of plural input operations.

To address the above-described problem, the present invention assists input operations of a computer in which a multiwindow system is installed. The present invention stores in a storage device and manages the input entity and an operation object of an input operation accepts from a user, and information about a window (an active window when the input operation is accepted) to which the operation object belongs, along with transition information indicating the transition of active windows concerned in previous input operations. When an active window transitions because of an input operation accepted from the user, it searches the storage device for information that contains information about a new active window and is associated with transition information matching the transition of active windows concerned in previous input operations. The searched information is classified by operation objects contained in the information. For each of the operation objects, at least one of input entities contained in the information classified into the operation object is outputted as a prediction value of a next input operation.

The present invention, which is a device for assisting input operations for a multiwindow system, includes a collecting section for collecting record information containing information about the input entity and an operation object of an input operation which the multiwindow system accepts from a user, and a window to which the operation object belongs; a storing section for storing statistics information of the record information collected by the collecting section along with transition information indicating the transition of active windows before the input operation corresponding to the record information; and a predicting section, when an active window transitions because of an input operation that the multiwindow system accepts from a user, for searching the storing section for statistics information that contains information about a new active window and is associated with transition information matching the transition of active windows before the input operation, classifying the searched statistics information by operation objects contained in the statistics information, and for each of the operation objects, outputting at least one of input entities contained in statistics information classified into that operation object as a prediction value of a next input operation for the operation object.

According to an embodiment of the present invention, for each of operation objects belonging to a same window, next input entities can be predicted collectively.

BRIEF DESCRIPTION OF THE DRAWINGS

FIG. 5 is a drawing schematically showing the registration contents of a hierarchy definition TL 16;

FIG. 6 is a drawing schematically showing the registration contents of the record information database 17;

FIG. 7 is a drawing schematically showing the registration contents of a statistics information database 18;

FIG. 10 is a flowchart for explaining the operation of a proposal window PG 14;

FIG. 13 shows a case where, in the screen example shown in FIG. 12, an ID and PW are directly or indirectly inputted to the ID input sub-window 511 and the PW input sub-window 512 of the employee portal window being displayed in the application window 60, and the ID and PW are passed to the APs $\mathbf{15}_1$ to $\mathbf{15}_n$ to which the application window 60 is allocated;

FIG. 14 shows a case where, in the screen example shown in FIG. 13, the selection button 513 corresponding to an item "task menu" of an employee portal window being displayed in the application window 60 is directly or indirectly selected, and the fact is notified to the APs $\mathbf{15}_1$ to $\mathbf{15}_n$ to which the application window 60 is allocated; and FIG. 15 shows a case where, in the screen example shown in FIG. 14, the selection button 514 corresponding to an item "business trips" of a task menu window being displayed in the application window 60 is directly or indirectly selected, and the fact is notified to the APs $\mathbf{15}_1$ to $\mathbf{15}_n$ to which the application window 60 is allocated.

DESCRIPTION OF THE PREFERRED EMBODIMENTS

Hereinafter, one embodiment of the present invention will be described.

Figure 1:
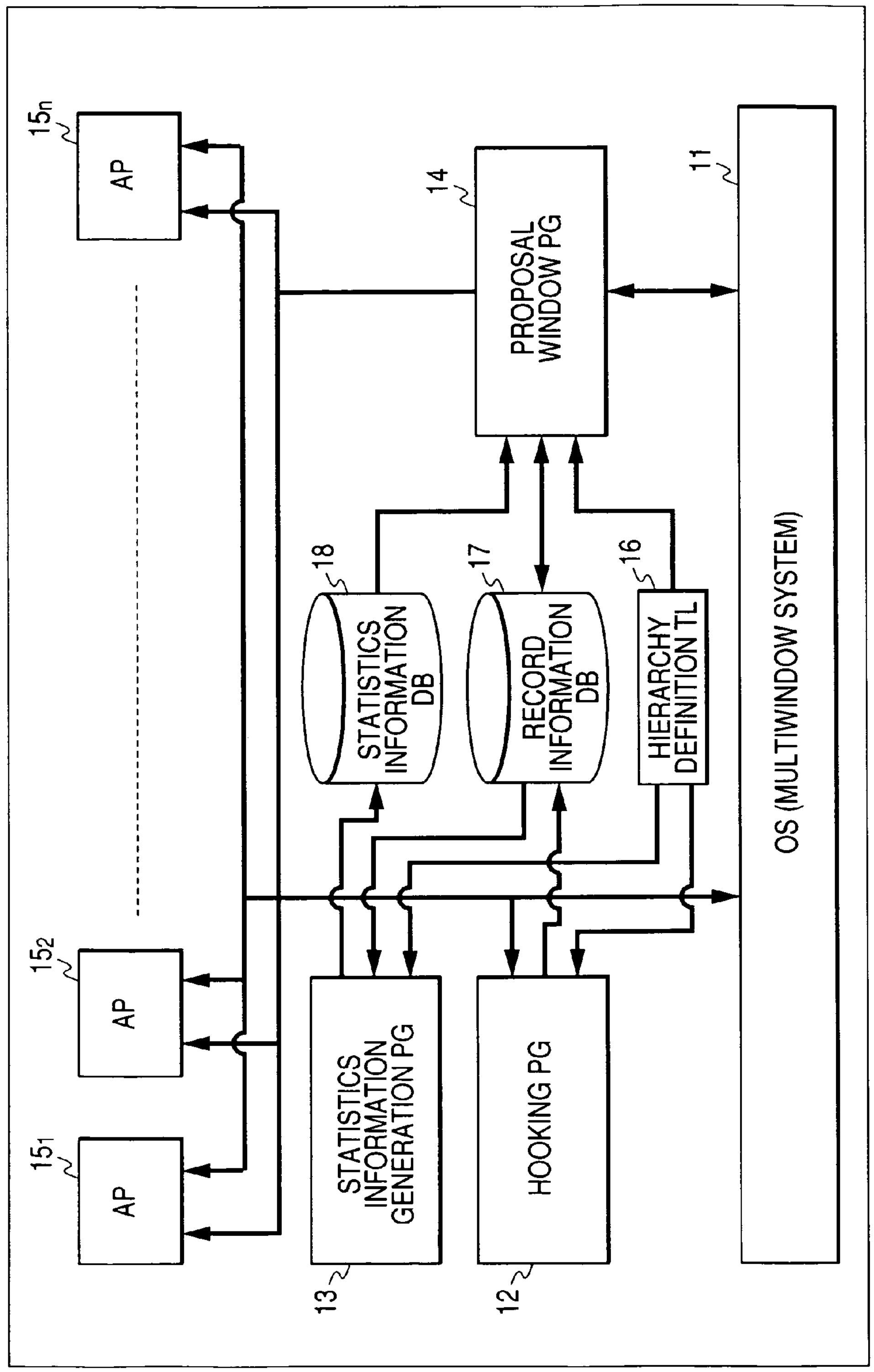
FIG. 1 is a software block diagram of a computer 1 with functions for assisting input operations to which one embodiment of the present invention is applied.

FIG. 1 is a software block diagram of a computer 1 with functions for assisting input operations to which one embodiment of the present invention is applied. As shown in the diagram, the computer 1 with functions for assisting input operations includes an OS 11, a hooking PG (program) 12, a statistics information generation PG 13, a proposal window PG 14, different application PGs (AP) $\mathbf{15}_1$ to $\mathbf{15}_n$, a hierarchy definition TL (table) 16, a record information database 17, and a statistics information database 18.

Figure 2:
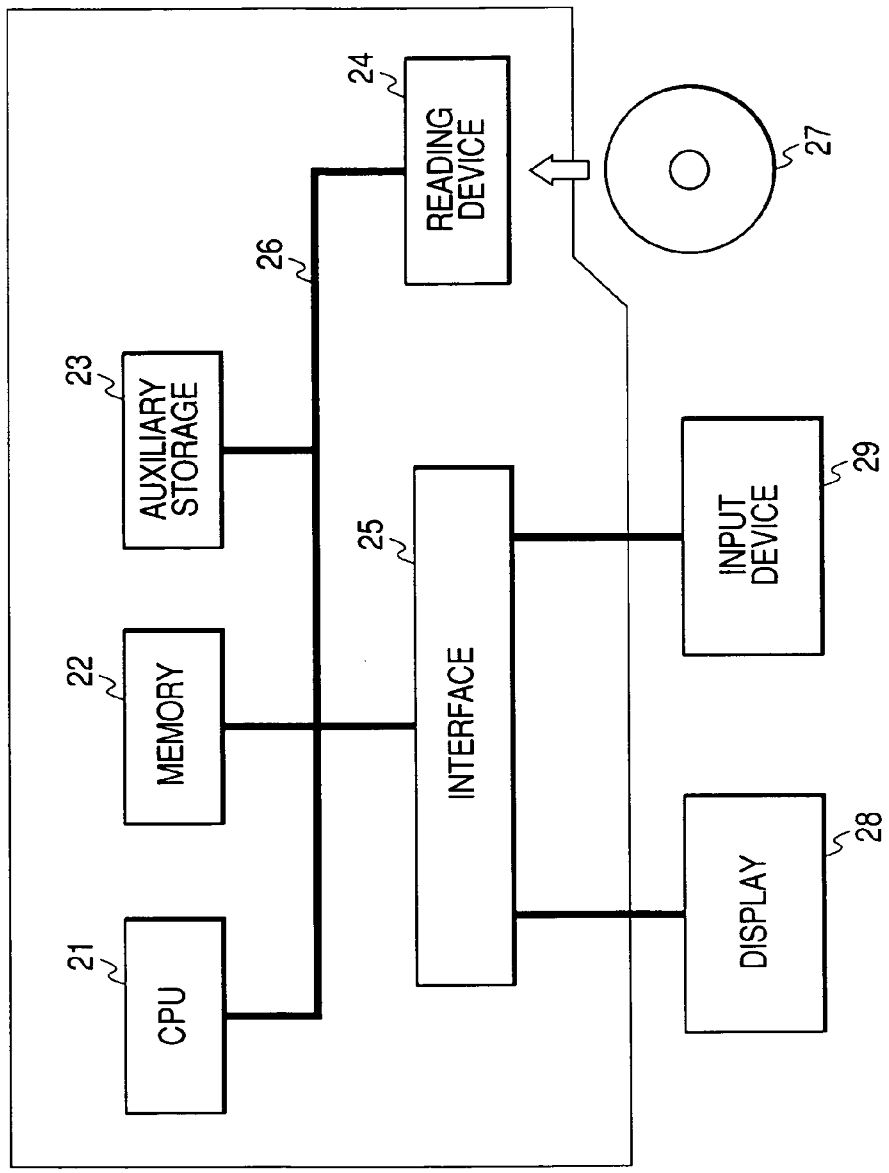
FIG. 2 is a drawing showing an example of the hardware configuration of the computer 1 with functions for assisting input operations shown in FIG. 1.

FIG. 2 is a drawing showing an example of the hardware configuration of the computer 1 with functions for assisting input operations shown in FIG. 1. As shown in the drawing, the computer 1 with functions for assisting input operations is a general computer that includes a CPU 21, memory 22, an auxiliary storage 23 such as a HDD, a reading device 24 that reads data from storage media 27 such as a CD-ROM, a DVD-ROM, and an IC card, an interface 25 for connecting to a display 28 and an input device 29 such as a keyboard and a mouse, and a bus 26 for connecting these devices. The OS 11, the hooking PG 12, the statistics information generation PG 13, and the proposal window PG 14, and the different application PGs (AP) $\mathbf{15}_1$ to $\mathbf{15}_n$ are loaded onto the memory 22 by the CPU 21 and executed. These programs are installed from the storage medium 27 to the auxiliary storage 23 via the reading device 24, and then loaded onto the memory 22. Although a program is a principal of operation for the sake of simplicity in the descriptions below, actually, the CPU 21 that executes the program is a principal of operation.

FIG. 1 is referred to back to continue the description. The OS 11 has functions as a multiwindow system. The multiwindow system is a system in which plural display windows called windows are displayed at the same time on a screen, and different applications, and modules or their subsets constituting the applications are allocated to the different windows so that the applications, and modules or their subsets constituting the applications can perform display on the windows allocated to them. Typical multiwindow systems are Windows(R) 2000 being an OS of Microsoft Corporation, and Mac OS being an OS of Apple Computer Inc.

Figure 3:
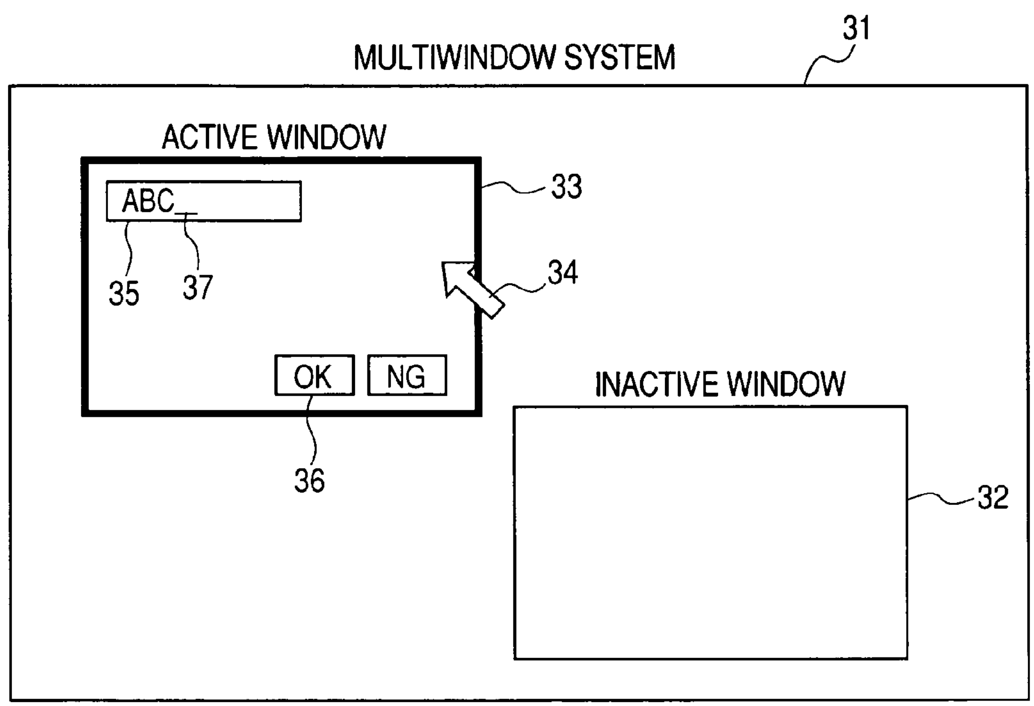
FIG. 3 is a drawing for explaining a multiwindow system.

FIG. 3 is a drawing for explaining a multiwindow system. As shown in the drawing, in the multiwindow system, plural windows 32 and 33 are displayed on a screen 31 at the same time. A different application, a-module constituting the application, or its subset is allocated to each of the windows 32 and 33, and display is performed by the allocated application, a module constituting the application, or its subset. A user switches to an active window by selecting the window by moving a mouse cursor 34 using a pointing device such as a mouse. Key input by the keyboard and click operations by the mouse are effective for an active window 33, and ineffective for inactive windows 32. The windows 32 and 33 include a sub-window 35 for displaying a keyed character string, and select buttons 36 by which selection is made by single- or double-clicking by the mouse cursor 34 in an active state. In FIG. 3, the reference numeral 37 denotes a key cursor indicating that the sub-window 35 allows key input.

Figure 4:
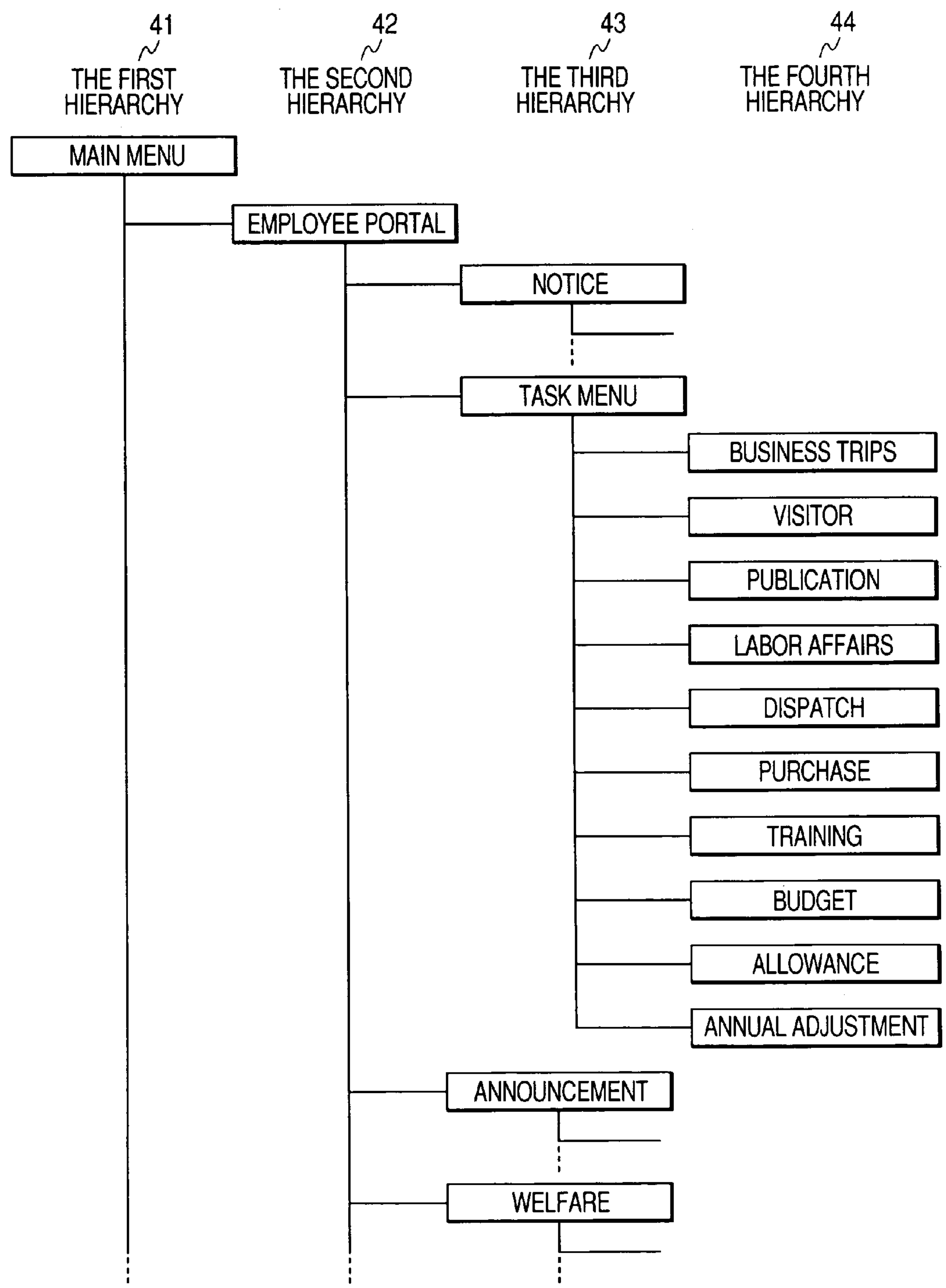
FIG. 4 is a drawing for explaining the hierarchy of some windows displayed by the OS 11.

In this embodiment, windows displayed by the OS 11 can be hierarchically managed. FIG. 4 is a drawing for explaining the hierarchy of some windows displayed by the OS 11. In the drawing, "main menu", which is the first window displayed on the screen first when the OS 11 is activated, is classified as the first hierarchy 41. "Employee portal", which is a window displayed on the screen by single- or double-clicking on an item "employee portal" displayed in the "main menu", is classified as the second hierarchy 42. "Notice", "task menu", "announcement", and "welfare", which are windows displayed on the screen by single- or double-clicking on items "notice", "task menu", and "announcement", and "welfare" respectively displayed in the "employee portal", are classified as the third hierarchy 43. "Business trips", "visitor", "publication", "labor affairs", "dispatch", "purchase", "training", "budget", "allowance", and "annual adjustment", which are windows displayed on the screen by single- or double-clicking on items "business trips", "visitor", "publication", "labor affairs", "dispatch", "purchase", "training", "budge", "allowance", and "annual adjustment" respectively displayed in "task menu", are classified as the fourth hierarchy.

The APs $\mathbf{15}_1$ to $\mathbf{15}_n$ run on the OS 11 and display information on windows allocated to the APs $\mathbf{15}_1$ to $\mathbf{15}_n$ by the OS 11. They receive a command from the user via the windows and perform processing according to the command. This embodiment assumes that one of the APs $\mathbf{15}_1$ to $\mathbf{15}_n$ is a business operation support application that supports business operation procedures of employees.

A hierarchy definition TL 16 registers definition information about hierarchies to which windows displayed by the OS 11 belongs. FIG. 5 is a drawing schematically showing the registration contents of the hierarchy definition TL 16. As shown in the drawing, in the hierarchy definition TL 16, a record 1600 is registered for each of the windows or sub-windows. The record 1600 has a field 1601 that registers identification information on a window or a sub-window, a field 1602 that, when the identification information registered in the field 1601 is a sub-window, registers identification information on a window to which the sub-window belongs, and a field 1603 that, when the identification information registered in the field 1601 is a window, registers information on a hierarchy to which the window belongs, while when a sub-window, information on a hierarchy to which a window identified by the identification information registered in the field 1602 belongs.

In the record information database 17, record information on user's input operations. on the computer 1 with functions for assisting input operations is registered. FIG. 6 is a drawing schematically showing the registration contents of the record information database 17. As shown in the drawing, in the record information database 17, a record 1700 is registered for each of user's input operations on the computer 1 with functions for assisting input operations. The record 1700 has a field 1701 for registering a record ID being identification information of the record, and at least one subrecord 1702. The subrecord 1702 is provided for each of unit operations.

The unit operation refers to an operation obtained by splitting user's input operations on the computer 1 with functions for assisting input operations into the smallest unit. Examples of the unit operation are a click operation and a drag operation by the mouse, and a key operation on one key of the keyboard.

The input operation refers to a meaningful operation consisting of at least one unit operation (as a command for the computer 1 with functions for assisting input operations). For example, when a unit operation is a click operation or a pulldown selection operation, the operation alone is a meaningful operation (selection of a clicked item, or selection of an item from a pulldown menu). Accordingly, when a unit operation is a click operation or a pulldown selection operation, the number of subrecords 1702 is one (see records 1700 of record IDs 00001, and 00004 to 00006). On the other hand, when a unit operation is a key operation on one key of the keyboard, the operation alone is not a meaningful operation. When a character string inputted by key operations on plural keys is converted into kanji characters by operating a conversion key, then an enter key is operated, these operations form a meaningful operation (input of a word or sentence). Accordingly, when a unit operation is a key operation on one key of the keyboard, the number of subrecords 1702 is plural (see records 1700 of record IDs 00008 and 00011).

The subrecord 1702 has a field 1703 for registering identification information of an input window being a window or sub-window on which a unit operation has been performed, a field 1704 for registering the input entity of the unit operation, a field 1705 for registering the hierarchy of a window on which the unit operation has been performed or a window to which a sub-window on which the unit operation has been performed belongs, and a field 1706 for registering an input data of the unit operation.

In the statistics information database 18, statistics information of record information registered in the record information database 7 is registered. FIG. 7 is a drawing schematically showing the registration contents of the statistics information database 18. As shown in the drawing, in the statistics information database 18, a record 1800 is registered in combination of transition information, input window, and input information. The input information refers to the information of an input entity indicated by an input operation. The transition information is information indicating the transition of active windows (limited to windows allocated to the APs $15_1$ to $15_n$) until an input operation indicated by input information corresponding to the transition information has been performed.

The record 1800 has a field 1801 for registering a statistics ID being record identification information, a field 1802 for registering transition information, a field 1803 for registering identification information of an input window being a window or sub-window on which an input operation was performed, a field 1804 for registering input information, and a field 1805 for registering a statistics value. Transition information registered in the field 1802 is information about the transition of a predetermined number of active windows (three in FIG. 7). As a statistics value registered in the field 1805, a statistics value of record information having a combination of transition information, input window, and input information that are shown in the fields 1802 to 1804 is registered. Statistics values are the total number of previous occurrences of the record information, a frequency indicating the number of occurrence of the record information in a predetermined unit period, and a cycle indicating an occurrence interval of the record information.

The hooking PG 12 hooks user's input operations (input window, input entity, input hierarchy, and input date) notified to the APs $15_1$ to $15_n$ from the OS 11, and registers the contents in the record information database 17.

Figure 8:
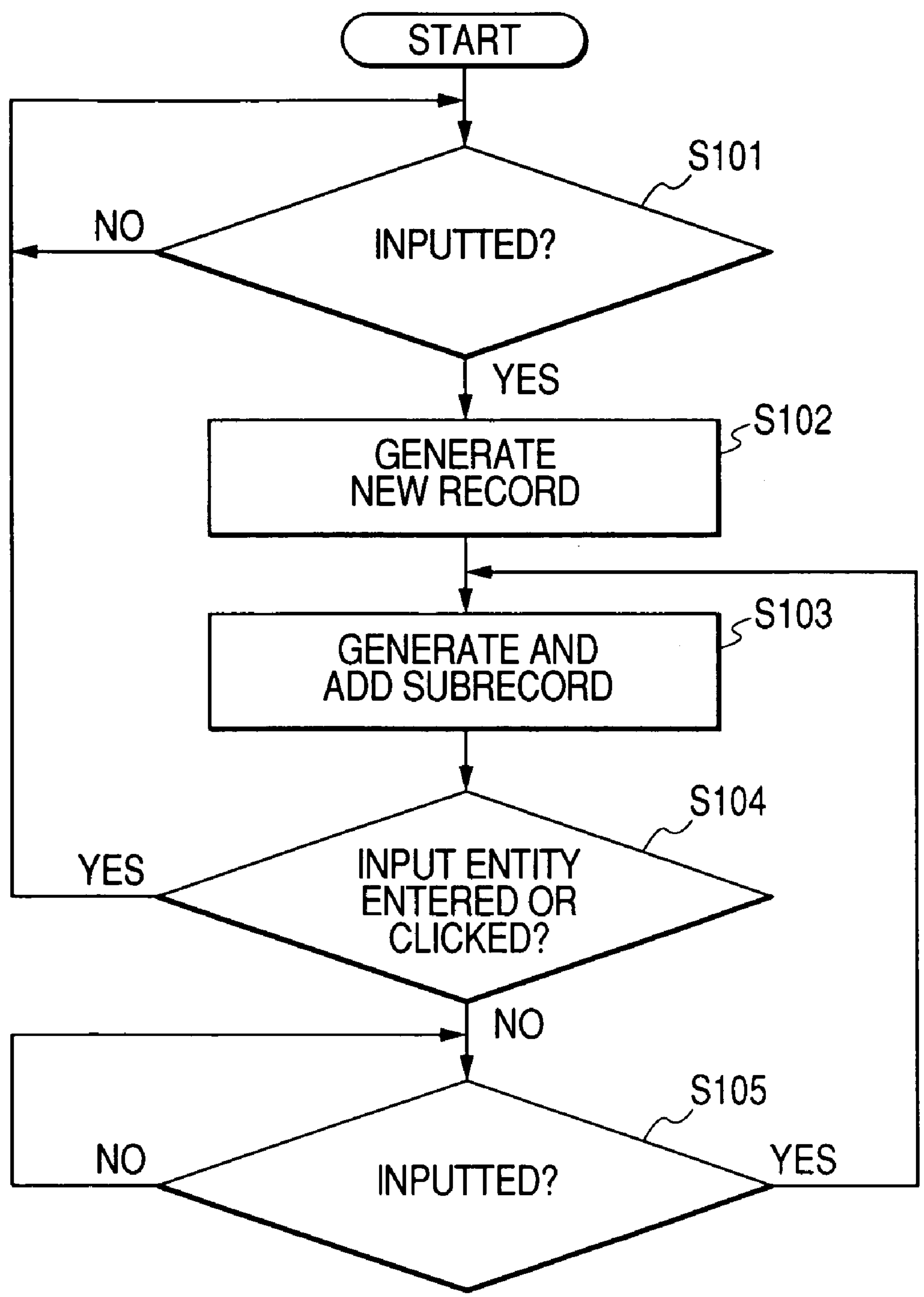
FIG. 8 is a flowchart for explaining the operation of a hooking PG 12.

FIG. 8 is a flowchart for explaining the operation of the hooking PG 12.

The hooking PG 12 monitors a unit operation notified to the APs $15_1$ to $15_n$ from the OS 11 (S101). On detecting the notification of a unit operation to the APs $15_1$ to $15_n$ from the OS 11 (YES in S101), the hooking PG 12 adds a new record 1700 to the record information database 17 and registers a unique record ID to the field 1701 of the record 1700 (S102).

The hooking PG 12 adds a subrecord 1702 to the record 1700, registers an input window of the detected unit operation in the field 1703 of the subrecord 1702, registers the input entity of the detected unit operation in the field 1704, registers the hierarchy of an input window of the detected unit operation in the field 1705, and registers the detection date of the detected unit operation in the field 1706 (S103). The hierarchy of an, input window is a hierarchy registered in the field 1604 of a record 1600 of which the input window is registered in the field 1601, in the hierarchy definition TL 16.

The hooking PG 12 checks whether the detected unit operation is a key operation of the enter key, a click operation on the mouse, or a pulldown operation (S104). In the case of a unit operation such as a key input operation of the enter key, a click operation on the mouse, or a pulldown operation, that unit operation is the last unit operation to constitute input operations. Accordingly, in this case (YES in S104), notification of input operations consisting of one unit operation from the OS 11 to the APs $15_1$ to $15_n$ is completed. In this case, the hooking PG 12 returns to S101 to monitor notification of a unit operation constituting new input operations from the OS 11 to the APs $15_1$ to $15_n$. On the other hand, when the detected unit operation is other than a key input operation of the enter key, a click operation on the mouse, or a pulldown operation (NO in S104), it means that notification of the input operations from the OS 11 to the APs $15_1$ to $15_n$ is not completed. In this case, the hooking PG 12 further monitors a unit operation notified to the APs $15_1$ to $15_n$ from the OS 11 (S105). On detecting the notification of a unit operation to the APs $15_1$ to $15_n$ from the OS 11 (YES in S105), the hooking PG 12 returns to S103 to create a subrecord 1702 and add it to the record 1700.

FIG. 1 is referred to back to continue the description. The statistics information generation PG 13 updates the statistics information database 18 on the basis of record information registered in the record information database 17.

Figure 9:
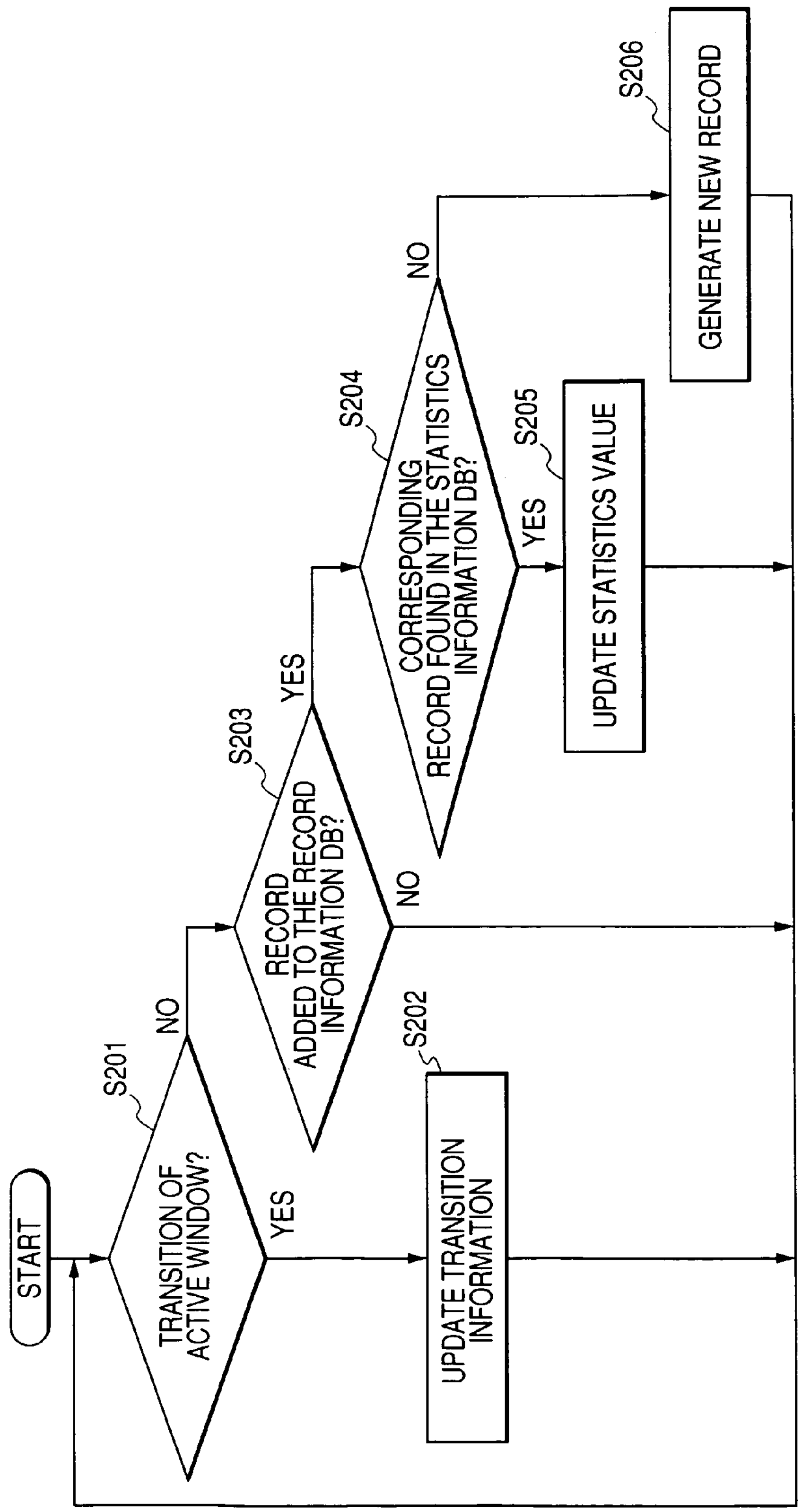
FIG. 9 is a flowchart for explaining the operation of a statistics information generation PG 13.

FIG. 9 is a flowchart for explaining the operation of the statistics information generation PG 13.

The statistics information generation PG 13 monitors active windows of the multiwindow system offered from the OS 11 (S201). When an active window switches from an existing window to another window (a window allocated to the APs $15_1$ to $15_n$) (YES in S201), it updates transition information owned by it (S202). The statistics information generation PG 13 holds a predetermined number of active windows from the past to the present (limited to windows allocated to the APs $15_1$ to $15_n$)

The statistics information generation PG 13 monitors the record information database 17 (S203). If a new record 1700 is added to the record information database 17 (YES in S203), it checks whether a record 1800 having transition information owned by it, an input window of a series of subrecords 1702 contained in the record 1700, and input information identified by the input entities of the series of subrecords 1702 that are respectively registered in fields 1802 to 1804 is registered in the statistics information database 18 (S204). If it is registered (YES in S204), the statistics information generation PG 13 updates a statistics value registered in the field 1805 of the record 1800 (S205). For example, when the type of the statistics value is a total number, it increments the value of the statistics value by one. When the type of the statistics value is frequency, it calculates the number of records 1700 having a series of subrecords 1702 matching input information of the record 1800, generated from a predetermined previous unit period to the present, on the basis of input date (field 1706) of the records 1700 registered in the record information database 17. The calculating result is registered as a statistics value. When the type of the statistics value is a cycle, it calculates the occurrence interval of records 1700 having a series of subrecords 1702 matching input information of the record 1800, on the basis of input date (field 1706) of the records 1700 registered in the record information database 17. The calculating result is registered as a statistics value.

On the other hand, in S204, when a record 1800 having transition information owned by the statistics information generation PG 13, an input window of a series of subrecords 1702 contained in the record 1700 newly added to the record information database 17, and input information identified by the input entities of the series of subrecords 1702 that are respectively registered in fields 1802 to 1804 is not registered in the statistics information database 18, the statistics information generation PG 13 newly creates the record 1800 and adds it to the statistics information database 18 (S206) A statistics value of the field 1805 of the record 1800 is 1 when the type of the statistics value is a total number or frequency, and null when cycle.

FIG. 1 is referred to back to continue the description. The proposal window PG 14 uses the record information database 17 and the statistics information database 18 to support input operations on an active window being displayed.

FIG. 10 is a flowchart for explaining the operation of the proposal window PG 14.

The OS 11 allocates two windows to the proposal window PG 14 by the multiwindow system. The proposal window PG 14 uses one of the two windows allocated by the OS 11 as a record window, and displays transition information held by it on the record window (S301). The proposal window PG 14 holds transition information of a predetermined number of active windows (limited to windows allocated to the APs 15$_1$ to 15$_n$) from the past to the present.

The proposal window PG 14 monitors an active window of the multiwindow system offered from the OS 11 (S302). When an active window switches from an existing window to another window (a window allocated to the APs 15$_1$ to 15$_n$) (YES in S302), it updates transition information owned by it and displays the updated transition information in the record window (S303).

The proposal window PG 14, when any one of windows allocated to the APs 15$_1$ to 15$_n$ is an active window, checks whether a record 1800 having input information with a sub-window belonging to the window as an input window, and the same transition information as that held by it is registered in the statistics information database 18 (S304). Specifically, it refers to the hierarchy definition TL 16 to search for a record 1600 having information about the window that is registered in field 1602. When such a record 1600 exists, the identification information of a sub-window registered in the field 1601 of the record 1600 is registered in field 1803 as an input window, and it checks whether a record 1800 having transition information held by it that is registered in field 1802 is registered in the statistics information database 18.

When such a record 1800 is registered in the statistics information database 18 (YES in S304), for each of sub-windows belonging to the active window, it extracts records 1800 having input information with a sub-window belonging to the window as an input window, and the same transition information as that held by it from the statistics information database 18 (S305). For each of sub-windows, it displays input information registered in field 1804 of the extracted records 1800 on the proposal window in the order of priority determined according to a statistics value registered in field 1805 of the records 1800 (S306), and then proceeds to S307. The order of priority is determined so that, when the type of the statistics value is a total number or frequency, the order of priority is higher if the statistics value is greater, and when the type of the statistics value is cycle, the order of priority is higher if the statistics value is smaller.

In S307, when the proposal window PG 14 receives an OK command of the record window from the user via the OS 11 (YES in S307), from input information displayed in the record window in units of sub-windows, it determines input information selected by the user for each of the sub-windows. Next, for each of the sub-windows it generates a record 1700 of input operations corresponding to the selected input information and registers it in the record information database 17. Then, it registers a unique record ID in field 1701 of the registered record 1700, and includes subrecords 1702 of unit operations constituting the input operations in the record 1700. Moreover, it records a sub-window in field 1703 of each subrecord 1702, the input entity of a unit operation in field 1704, the hierarchy of an active window defined in the hierarchy definition TL 16 in field 1705, and current date in field 1706 (S308), and then proceeds to S309. On the other hand, in S307, when the proposal window PG 14 receives an NG command of the record window from the user via the OS 11 (NO in S307), it immediately proceeds to S309.

In S309, the proposal window PG 14, when any one of windows allocated to the APs 15$_1$ to 15$_n$ is an active window, checks whether a record 1800 having input information with the window as an input window, and the same transition information as that held by it is registered in the statistics information database 18. Specifically, it refers to the hierarchy definition TL 16 to search for a record 1600 having information about the window that is registered in field 1601. When such a record 1600 exists, the identification information of a window registered in the field 1601 of the record 1600 is registered in field 1803 as an input window, and it checks whether a record 1800 having transition information held by it that is registered in field 1802 is registered in the statistics information database 18.

When such a record 1800 is registered in the statistics information database 18 (YES in S309), it extracts records 1800 having input information with an active window as an input window, and the same transition information as that held by it from the statistics information database 18 (S310). It displays input information registered in field 1804 of the extracted records 1800 on the proposal window in the order of priority determined according to a statistics value registered in field 1805 of the records 1800 (S311), and then proceeds to S312. The order of priority is determined so that, when the type of the statistics value is a total number or frequency, the order of priority is higher if the statistics value is greater, and when the type of the statistics value is cycle, the order of priority is higher if the statistics value is smaller.

In S312, when the proposal window PG 14 receives an OK command of the record window from the user via the OS 11 (YES in S312), it determines input information selected by the user from input information displayed in the record window. Next, it generates a record 1700 of record information of input operations corresponding to the selected input information, and registers it in the record information database 17.

Then, it registers a unique record ID in field 1701 of the registered record 1700, and includes subrecords 1702 of unit operations constituting the input operations in the record 1700. Moreover, it records a sub-window in field 1703 of each subrecord 1702, the input entity of a unit operation in field 1704, the hierarchy of an active window defined in the hierarchy definition TL 16 in field 1705, and current date in field 1706 (S313), and then proceeds to S302. On the other hand, in S312, when the proposal window PG 14 receives an NG command of the record window from the user via the OS 11 (NO in S312), it immediately proceeds to S302.

The following describes the operation of the proposal window PG 14 shown in FIG. 10, using a screen example.

Figure 11A:
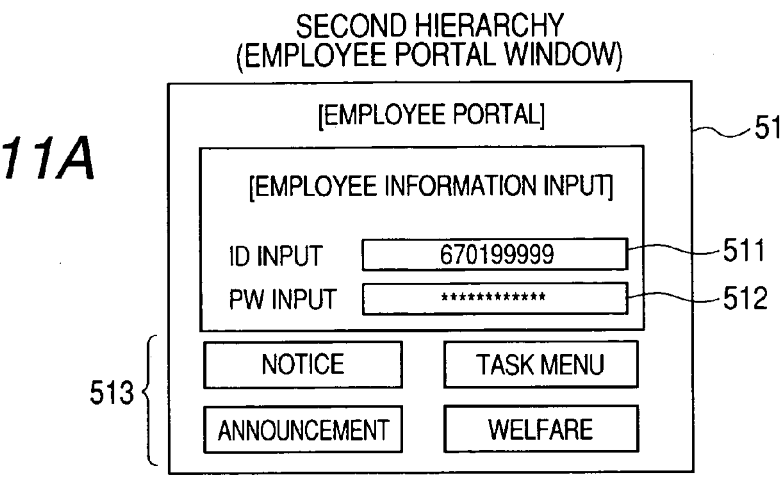
FIG. 11A, FIG. 11B, and FIG. 11C are drawings for explaining windows allocated to one of the APs $\mathbf{15}_1$ to $\mathbf{15}_n$ by the OS 11.
Figure 11B:
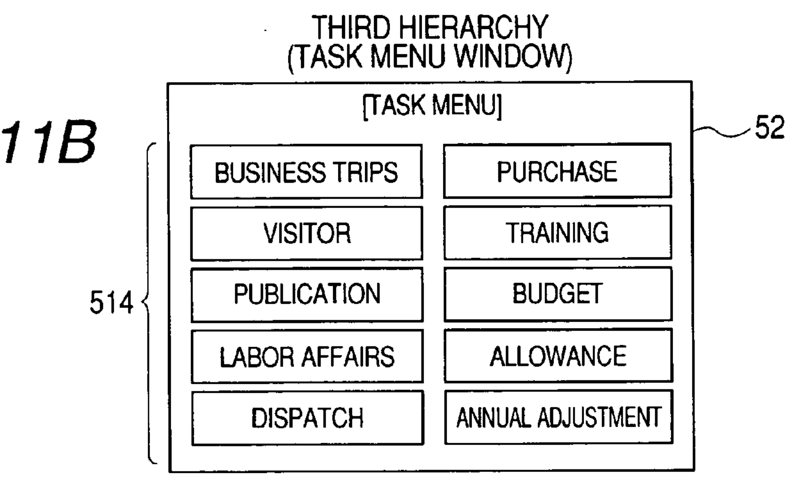
Figure 11C:
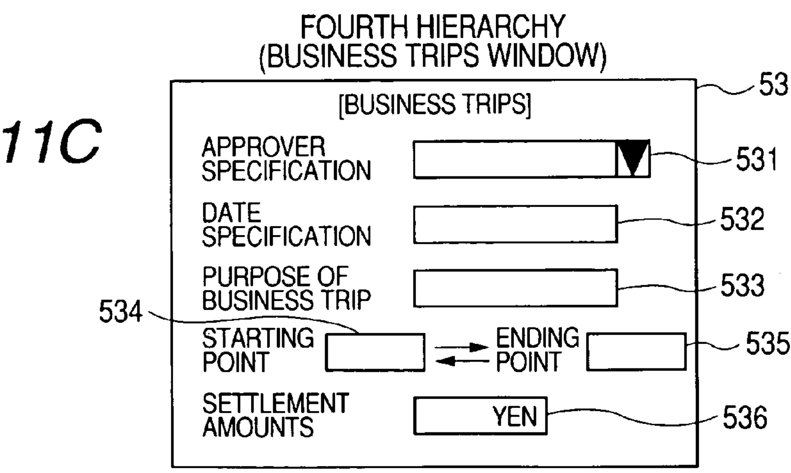

FIG. 11A, FIG. 11B, and FIG. 11C are drawings for explaining windows allocated to one of the APs $\mathbf{15}_1$ to $\mathbf{15}_n$ by the OS 11. A window shown in FIG. 11A is an employee portal window 51 displayed by single- or double-clicking an item "employee portal" displayed in a window "main menu" of the first hierarchy displayed in the first screen displayed when the OS 11 is activated. The window belongs to the second hierarchy. As shown in the drawing, the window has a sub-window 511 for inputting an employee ID, a sub-window 512 for inputting PW, and a selection button 513 for newly displaying windows of "notice", "task menu", "announcement", and "welfare".

A window shown in FIG. 11B is a task menu window 52 displayed by single- or double-clicking the item "task menu" displayed in the window "employee portal" of the second hierarchy. The window belongs to the third hierarchy. As shown in the drawing, the window has selection buttons 514 for newly displaying windows of "business trips", "visitor", "publication", "labor affairs", "dispatch", "purchase", "training", "budget", "allowance", and "annual adjustment".

A window shown in FIG. 11C is a business trips window 53 displayed by single- or double-clicking the item "business trips" displayed in the window "task menu" of the third hierarchy. The window belongs to the fourth hierarchy. As shown in the drawing, the window has a sub-window 531 for inputting (selecting) approver specification, a sub-window 532 for inputting date specification, a sub-window 533 for inputting the purpose of a business trip, a sub-window 534 for inputting the starting point of the business trip, and a sub-window 535 for inputting the ending point of the business trip, and a sub-window 536 for registering settlement amounts.

To describe the operation (input operation assistance) of the proposal window PG 14, the following uses an example that (1) the item "employee portal" is selected from the main menu to display the employee portal window 51, (2) the item "task menu" is displayed from the employee portal window 51 to display the task menu window 52, and then (3) the item "business trips" is selected from the task menu window 52 to display the business trips window 53.

FIGS. 12 to 15 show examples of windows displayed in a display screen. As shown in the drawings, the display screen has an application window 60 being a window allocated to the APs $\mathbf{15}_1$ to $\mathbf{15}_n$, and a record window 70 and a proposal window 80 that are allocated to the proposal window PG 14.

Figure 12:
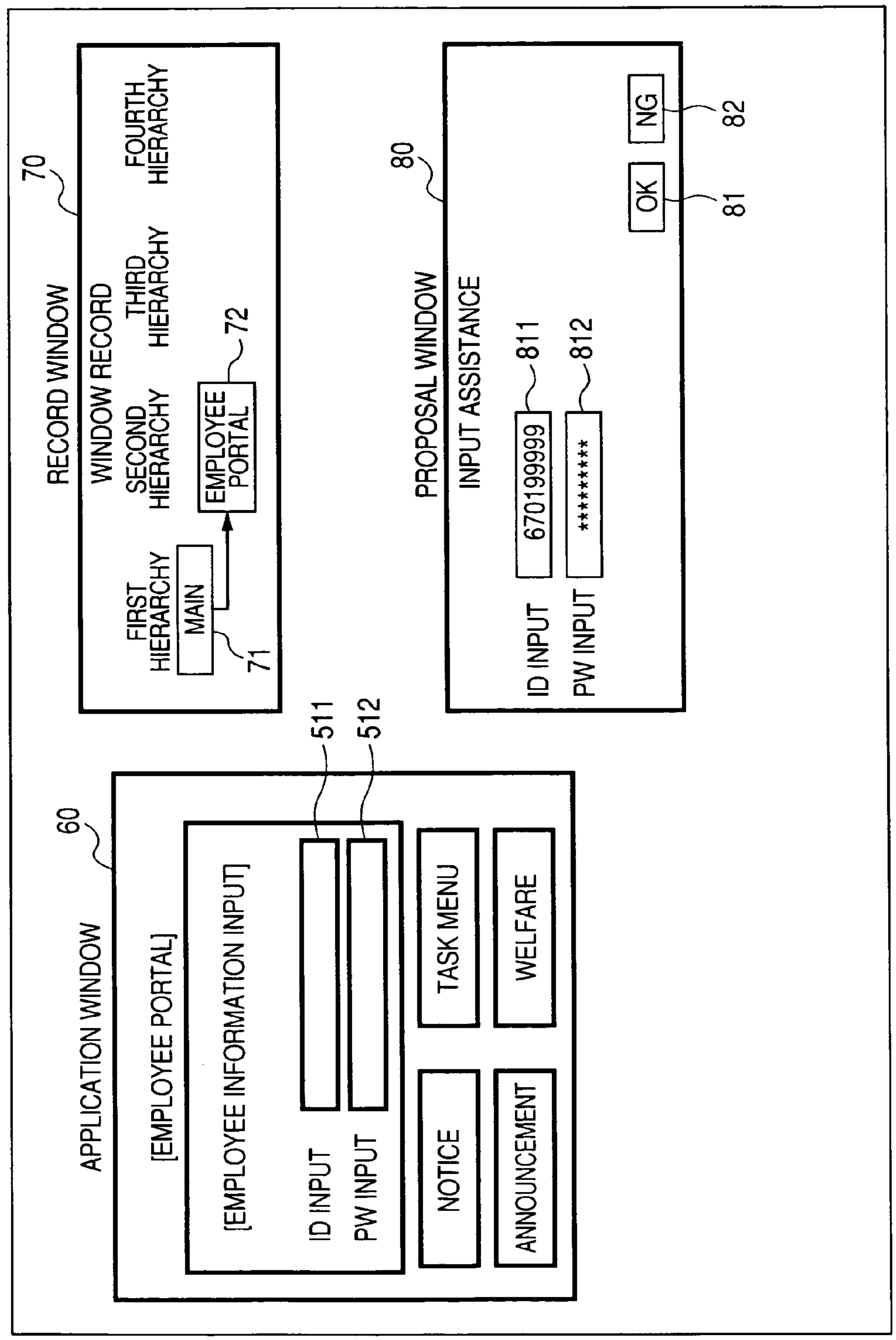
FIG. 12 shows a case where an item "employee portal" is selected from a main menu, and a real window 60 for displaying an employee portal is switched to an active window.

FIG. 12 shows a case where the item "employee portal" is selected from the main menu, and a real window 60 for displaying an employee portal is switched to an active window. In this case, S302 and S303 of FIG. 10 are executed, and in the record window 70, transition information indicating transition from a main menu 71 of the first hierarchy to an employee portal 72 of the second hierarchy is displayed as transition information. Next, S304 to S306 in FIG. 10 are executed, and the active window is switched from an application window 60 to the proposal window 80. At the same time, in the proposal window 80, for each of ID input sub-window 811 and a PW input sub-window 812 that belong to the employee portal window, input information with a sub-window concerned as an input window that is associated with the same transition information as transition information being displayed in the record window 70 is displayed in descending order of statistics values. However, in this embodiment, record information of input operations for the ID input sub-window 811 and PW input sub-window 812 is not registered in the record information database 17. Accordingly, in the proposal window 80, ID input sub-window 811 and PW input sub-window 812 for which no information is inputted are displayed.

In FIG. 12, when the user inputs his (her) own ID and PW to the ID input sub-window 811 and the PW input sub-window 812 displayed in the proposal window 80, respectively, and selects an OK button 81 by using the mouse or the like, information about the inputted ID and PW is reflected in the ID input sub-window 511 and the PW input sub-window 512 of the employee portal window being displayed in the application program window 60. At the same time, the active window switches from the proposal window 80 to the application program window 60. Thereby, the ID and PW are passed to the APs $\mathbf{15}_1$ to $\mathbf{15}_n$ to which the application window 60 is allocated. As described above, record information of input operations for the ID input sub-window 511 and PW input sub-window 512 is not registered in the record information database 17. Accordingly, in this case, S308 is not executed. On the other hand, in FIG. 12, when the user selects the NG button 82 displayed in the proposal window 80 by using the mouse and the like, the active window switches from the proposal window 80 to the application window 60 without the input information of the ID input sub-window 811 and the PW input sub-window 812 being reflected in the ID input sub-window 511 and the PW input sub-window 512 of the employee portal window being displayed in the application program window 60. In this case, the user directly inputs an ID and a PW to the ID input sub-window 511 and the PW input sub-window 512 of the employee portal window by key input operations.

FIG. 13 shows a case where, in the screen example shown in FIG. 12, an ID and PW are directly or indirectly inputted to the ID input sub-window 511 and the PW input sub-window 512 of the employee portal window being displayed in the application window 60, and the ID and PW are passed to the APs $\mathbf{15}_1$ to $\mathbf{15}_n$ to which the application window 60 is allocated. In this case, S309 to S311 of FIG. 10 are executed, and the active window is switched from an application window 60 to the proposal window 80. At the same time, in the proposal window 80, input information 821 with the employee portal window as an input window that is associated with the same transition information as transition information being displayed in the record window 70 is displayed in descending order of statistics values.

In FIG. 13, when the user checks any of check boxes 83 displayed in the proposal window 80 by using the mouse or the like, and selects the OK button 81, input information 821 corresponding to the checked check boxes 83 is reflected in the selection button 513 being displayed in the application window 60, and the active window switches from the proposal window 80 to the application window 60. Thereby, the selection of the selection buttons 513 corresponding to the input information 821 is notified to the APs $\mathbf{15}_1$ to $\mathbf{15}_n$ to which the application window 60 is allocated. On the other hand, in FIG. 13, when the user selects the NG button 82 displayed in the proposal window 80 by using the mouse and the like, the active window switches from the proposal window 80 to the application window 60 without the contents of the proposal window 80 being reflected in the selection buttons 513 of the employee portal window being displayed in the application window 60. In this case, the user directly selects any of the selection buttons 513 being displayed in the employee portal window directly by using the mouse and the like.

FIG. 14 shows a case where, in the screen example shown in FIG. 13, the selection button 513 corresponding to the item "task menu" of the employee portal window being displayed in the application window 60 is directly or indirectly selected, and the fact is notified to the APs $15_1$ to $15_n$ to which the application window 60 is allocated. In this case, S302 and S303 of FIG. 10 are executed, and in the record window 70, transition information indicating that the main menu 71 of the first hierarchy transitions to the employee portal 72 of the second hierarchy, which transitions to the task menu 73 of the third hierarchy, is displayed. Since the task menu window has no sub-window as shown in FIG. 11B, S305 to S308 of FIG. 10 are not executed. S309 to S311 of FIG. 10 are executed, and the active window switches from the application window 60 to the proposal window 80. At the same time, in the proposal window 80, input information 831 with the task menu window as an input window that is associated with the same transition information as transition information being displayed in the record window 70 is displayed in descending order of statistics values.

In FIG. 14, when the user checks any of check boxes 83 displayed in the proposal window 80 by using the mouse or the like, and selects the OK button 81, input information 831 corresponding to the checked check boxes 83 is reflected in the selection buttons 514 being displayed in the application window 60, and the active window switches from the proposal window 80 to the application window 60. Thereby, the selection of the selection buttons 514 corresponding to the input information 813 is notified to the APs $15_1$ to $15_n$ to which the application window 60 is allocated. On the other hand, in FIG. 14, when the user selects the NG button 82 displayed in the proposal window 80 by using the mouse and the like, the active window switches from the proposal window 80 to the application window 60 without the contents of the proposal window 80 being reflected in the selection buttons 514 of the task menu window being displayed in the application window 60. In this case, the user directly selects any of the selection buttons 514 being displayed in the task menu window directly by using the mouse and the like.

FIG. 15 shows a case where, in the screen example shown in FIG. 14, the selection button 514 corresponding to the item "business trips" of the task menu window being displayed in the application window 60 is directly or indirectly selected, and the fact is notified to the APs $15_1$ to $15_n$ to which the application window 60 is allocated. In this case, S302 and S303 of FIG. 10 are executed, and in the record window 70, transition information indicating that the main menu 71 of the first hierarchy transitions to the employee portal 72 of the second hierarchy, which transitions to the task menu 73 of the third hierarchy, which transitions to the business trips 74 of the fourth hierarchy is displayed. Next, S304 to S306 of FIG. 10 is executed, and the active window switches from the application window 60 to the proposal window 80. At the same time, in the proposal window 80, for each of an approver specification sub-window 841 of the business trips window, a date specification sub-window 842, a business trip purpose sub-window 843, a starting point sub-window 844, an ending point sub-window 845, and a settlement amount sub-window 846, input information with a sub-window concerned as an input window that is associated with the same transition information as transition information being displayed in the record window 70 is displayed in descending order of statistics values.

In FIG. 15, in the sub-windows 841 to 846 displayed in the proposal window 80, when the user checks desired check boxes 83 and selects the OK button 81 by using the mouse or the like, input information corresponding to the checked check boxes 83 is reflected in corresponding sub-windows 531 to 537 of the business trips window being displayed in the application window 60, and the active window switches from the proposal window 80 to the application window 60. Thereby, contents reflected in the sub-windows 531 to 537 are passed to the APs $15_1$ to $15_n$ to which the application window 60 is allocated. On the other hand, in FIG. 15, when-the user selects the NG button 82 displayed in the proposal window 80 by using the mouse and the like, the active window switches from the proposal window 80 to the application window 60 without the contents of the proposal window 80 being reflected in corresponding sub-windows 531 to 537 of the business trips window being displayed in the application window 60. In this case, the user directly inputs information to the sub-windows 531 to 537 belonging to the business trips window by key input operations.

Hereinbefore, one embodiment of the present invention has been described.

In this embodiment, input operations on plural operation target items belonging to same window can be predicted collectively.

The present invention is not limited to the above-described embodiment, and may be modified in various ways within the scope of the main purports of the present invention. For example, although, in the above-described, a window or sub-window is eligible as an input window, input operations may be predicted with a tab, tag, spread sheet, and the like as input windows.

In the above-described, the record information database 17 and the statistics information database 18 may be provided for each user, and the record information database 17 and the statistics information database 18 that are to be used may be changed for each user. Which record information database 17 and statistics information database 18 to use may be managed by a user's employee ID and determined by an ID inputted to the ID input sub-window 511.

What is claimed is:

1. A device for assisting input operations for a multiwindow system, comprising:

a processor;

a collecting section that operates on the processor to cause the processor to collect record information containing information about the input entity and an operation object of an input operation which the multiwindow system accepts from a user, and a window to which the operation object belongs;

a storing section that stores statistics information of the record information collected by the collecting section along with transition information indicating the transition of active windows before the input operation corresponding to the record information;

a proposing section, when an active window transitions because of an input operation that the multiwindow system accepts from a user, that operates on the processor to cause the processor to search the storing section for statistics information that contains information about a new active window and is associated with transition information matching the transition of active windows before the input operation, classify the searched statistics information by operation objects contained in the statistics information, and for each of the operation objects, output at least one of input entities contained in statistics information classified into each of the operation objects to display a set of candidate input entities for the operation objects in said new active window; and an updating section that operates on the processor to cause the processor to update statistics values of statistics information that is associated with transition information indicating the transition of active windows before an input operation corresponding to record information collected by the collecting section, and contains the same information about the input entity and an operation object of an input operation and a window to which the operation object belongs, as the record information, wherein the proposing section, for each of the operation objects, on the basis of statistics values of statistics information classified into that operation object, operates on the processor to cause the processor to output at least one of input entities contained in the statistics information classified into each of the operation objects to display a set of candidate input entities for the operation objects in said new active window.

2. The device for assisting input operations according to claim 1, wherein the proposing section operates on the processor to cause the processor to display the transition information indicating the transition of active windows before the input operation that the multiwindow system accepts from the user, in a first window allocated by the multiwindow system, and wherein the proposing section further operates on the processor to cause the processor to display, for each of the operation objects, the at least one of the input entities contained in the statistics information classified into each of the operation objects to display the set of candidate input entities for the operation objects, in a second window allocated by the multiwindow system.

3. The device for assisting input operations according to claim 2, wherein the proposing section operates on the processor to cause the processor to reflect, for each of the operation objects, one of next input operation proposals displayed in the second window in a window switched to an active state by an input operation that the multiwindow system accepts from the user.

4. A computer program product comprising:

a computer program for a computer in which a multiwindow system is installed; and a computer-readable storage medium having the computer program tangibly embodied thereon, wherein the computer program causes the computer to:

collect record information containing information about the input entity and an operation object of an input operation which the multiwindow system accepts from a user, and a window to which the operation object belongs;

store statistics information of the record information collected by the collecting section along with transition information indicating the transition of active windows before the input operation corresponding to the record information in a storing section;

when an active window transitions because of an input operation that the multiwindow system accepts from a user, search the storing section for statistics information that contains information about a new active window and is associated with transition information matching the transition of active windows before the input operation, classify the searched statistics information by operation objects contained in the statistics information, and for each of the operation objects, output at least one of input entities contained in statistics information classified into each of the operation objects to display a set of candidate input entities for the operation objects in said new active window; and update statistics values of statistics information that is associated with transition information indicating the transition of active windows before an input operation corresponding to record information collected, and contains the same information about the input entity and an operation object of an input operation and a window to which the operation object belongs, as the record information, wherein for each of the operation objects, on the basis of statistics values of statistics information classified into that operation object, the computer program further causes the computer to output at least one of input entities contained in the statistics information classified into each of the operation objects to display a set of candidate input entities for the operation objects in said new active window.

5. A method by which a computer assists input operations for a multiwindow system, comprising:

collecting, by the computer, record information containing information about the input entity and an operation object of an input operation which the multiwindow system accepts from a user, and a window to which the operation object belongs;

storing statistics information of the collected record information along with transition information indicating the transition of active windows before the input operation corresponding to the record information in a storage device;

when an active window transitions because of an input operation that the multiwindow system accepts from a user, searching, by the computer, the storage device for statistics information that contains information about a new active window and is associated with transition information matching the transition of active windows before the input operation, classifying, by the computer, the searched statistics information by operation objects contained in the statistics information, and for each of the operation objects, outputting, by the computer, at least one of input entities contained in statistics information classified into each of the operation objects to display a set of candidate input entities for the operation objects in said new active window; and updating statistics values of statistics information that is associated with transition information indicating the transition of active windows before an input operation corresponding to record information collected, and contains the same information about the input entity and an operation object of an input operation and a window to which the operation object belongs, as the record information, wherein for each of the operation objects, on the basis of statistics values of statistics information classified into that operation object, the method further comprising outputting at least one of input entities contained in the statistics information classified into each of the operation objects to display a set of candidate input entities for the operation objects in said new active window.

* * * * *